Dec. 10, 1968  W. J. COLLINS  3,415,124
DEVICE FOR SAMPLING MOLTEN METAL
Filed Oct. 31, 1966  4 Sheets-Sheet 1

INVENTOR.
WILLIAM J. COLLINS
BY
Charles A. Penfold
ATTORNEY

Dec. 10, 1968  W. J. COLLINS  3,415,124
DEVICE FOR SAMPLING MOLTEN METAL
Filed Oct. 31, 1966  4 Sheets-Sheet 3

INVENTOR.
WILLIAM J. COLLINS
BY
Charles S. Penfold
ATTORNEY

Dec. 10, 1968 W. J. COLLINS 3,415,124
DEVICE FOR SAMPLING MOLTEN METAL
Filed Oct. 31, 1966 4 Sheets-Sheet 4

INVENTOR.
WILLIAM J. COLLINS
BY
Charles S. Penfold
ATTORNEY

United States Patent Office 3,415,124
    Patented Dec. 10, 1968

3,415,124
    DEVICE FOR SAMPLING MOLTEN METAL
    William J. Collins, 722 Buchanan St., Gary, Ind. 46402
    Continuation-in-part of application Ser. No. 391,654,
    Aug. 24, 1964. This application Oct. 31, 1966, Ser.
    No. 590,829
    18 Claims. (Cl. 73—425.4)

ABSTRACT OF THE DISCLOSURE

A device for sampling molten metal. A particular mold comprising two frangible and separable portions is enclosed at the end of a long handle. The sample when solidified is in a shape resembling a lollipop.

---

This application is a continuation in part of my application Ser. No. 391,654.

The subject invention relates generally to means utilized in conjunction with testing equipment and more particularly is directed to a device which is adapted for use in obtaining a sample of molten metal from a chamber for analysis.

The device may be employed wherever applicable and has proven very efficient and reliable in obtaining samples of molten metal for chemical analysis of all of its elements including the amount of gases, such as oxygen, hydrogen and nitrogen contained therein may be ascertained. The sample may be obtained from any chamber such as an open hearth furnace, a basic oxygen vessel, electric furnace or related metal making facility. The sample obtained may also be tested to determine its physical characteristics.

With the foregoing in mind, one of the important objects of the subject invention is to provide a device whereby a representative sample of a liquid, such as molten metal, may be readily obtained so that a correct or accuarte analysis can be made, as distinguished from some procedures which fail to produce a representative sample for testing.

Another important object of the invention is to provide a device embodying improved principles of design and construction whereby the sample or specimen obtained by the device is deoxidized in order to condition the specimen for analysis. More specifically in this respect, a quantity of a fusible element, such as aluminum and constituting deoxidizing means and a quantity of the specimen have been predetermined or proportioned whereby the specimen is substantially completed deoxidized.

A significant object of the invention is to provide an improved method whereby the molten metal may be deoxidized or conditioned while it is being received by the device.

Another important object of the invention is to provide a device which, among other things, comprises an outer protective tubular housing; means disposed in the housing for receiving the molten metal; supporting means, such as a mass of earthen material, which surrounds and supports the receiving means in the housing; means communicatively connected with the receiving means and providing an upper or escape chamber; means providing a lower entrance structure or chamber means communicating with the receiving means, means disposed in relation to the entrance structure for deoxidizing the molten metal prior to its entry into the receiving means, the escape chamber affording a vent to permit release of air from the receiving means upon introduction of the molten metal thereto.

Another object is to provide means within the outer housing which assists in stabilizing an upper extremity of the supporting means for the receiving means, as well as in defining the upper or escape chamber.

A specific object of the invention is to provide means within the escape chamber whereby to retard or stop the flow of metal into this chamber while permitting release of the air therethrough.

Another object of the invention is to provide a setup in which the lower entrance structure is preferably comprised of a plurality of chambers having partitions or walls therebetween which are respectively provided with ports or apertures which are preferably so disposed that the molten metal, upon being successively received in the chambers will be caused to flow in what may be termed a tortuous path in order to create turbulence and thereby promote mixing of the deoxidizing means with the molten metal prior to its introduction into the receiving means.

Another specific object of the invention is to provide a lower chamber structure which is preferably comprised of a plurality of nested metal cups which are preferably held together in a pressed sealed relationship with respect to one another and in sealed relationship to the receiving means.

A further object of the invention is to provide a lower chamber structure, receiving means and supporting means therefor, which are operatively connected to provide a subassembly which may be installed in the outer protective housing or support by merely pressing the subassembly into place in such a manner that rim portions of the cup members will automatically force themselves into indenting relationship with the interior cylindrical surface of the outer housing, and thereby lock the subassembly in the desired operation position therein.

Also, an important object of the subject invention is to provide a device of the general character above referred to in which the lower chamber structure is preferably provided with a cap which is connected to the lowermost of the cup members of the chamber structure in order to protect this lower cup which preferably carries the deoxidizing means.

A particular object of the invention is to provide means whereby to protect at least a portion of the outer housing so as to prevent the housing, if it is deteriorated during immersion in molten metal, from contaminating the specimen adapted to be received by the device.

A further object of the invention is to provide a sampling device whereby an outer housing thereof is completely protected or shielded so that the housing will not explode or cause contamination of the specimen when the device is dipped into molten metal.

A specific object of the invention is to provide a wand provided with a socket or receiving structure and the socket and an end of a sampling device are so designed and constructed that one end of the device may be readily detachably held in the socket whereby to facilitate manipulation of the device and, at the same time, promote safety.

Another significant object of the subject invention is to provide an improved modified device for sampling metal in which the sizes, number, and/or structural characteristics of certain of the components are relatively less or different from those embodied in the devices above described.

An important object is to provide such a device with a receiving means or mould structure which embodies improved principles of design and construction whereby to accommodate molten metal in a unique manner.

More specifically, an object of the invention is to provide a receiving means which is preferably comprised of a pair of corresponding half sections which, when assembled, define a chamber for receiving the metal for solidification and a tubular passage through which the metal enters the chamber.

Also, an object is to design and construct the sections in a manner whereby to provide one or more openings or vents through which air or gas may escape when the molten metal enters the chamber.

A specific object of the invention is to provide improved means for maintaining the sections assembled, and means for supporting the sections and certain components operatively associated therewith.

Additional objects reside in providing a device which offers advantages with respect to manufacture and assembly, efficiency, durability, safety, and destruction whereby to obtain access to the recovered specimen.

Other objects and advantages of the invention will become apparent after the description hereinafter set forth is considered in conjunction with the drawings annexed hereto.

Referring to the drawings.

The device may be designed and constructed as exemplified in FIGURES 1 through 6, as in FIGURES 7 through 10, FIGURES 11 through 13, FIGURES 14 through 17 or in other ways as will be alluded to hereinafter. The structure illustrated in FIGURES 1 through 6 will now be described.

Figures 1, 2, 3, 4, 5, 6:
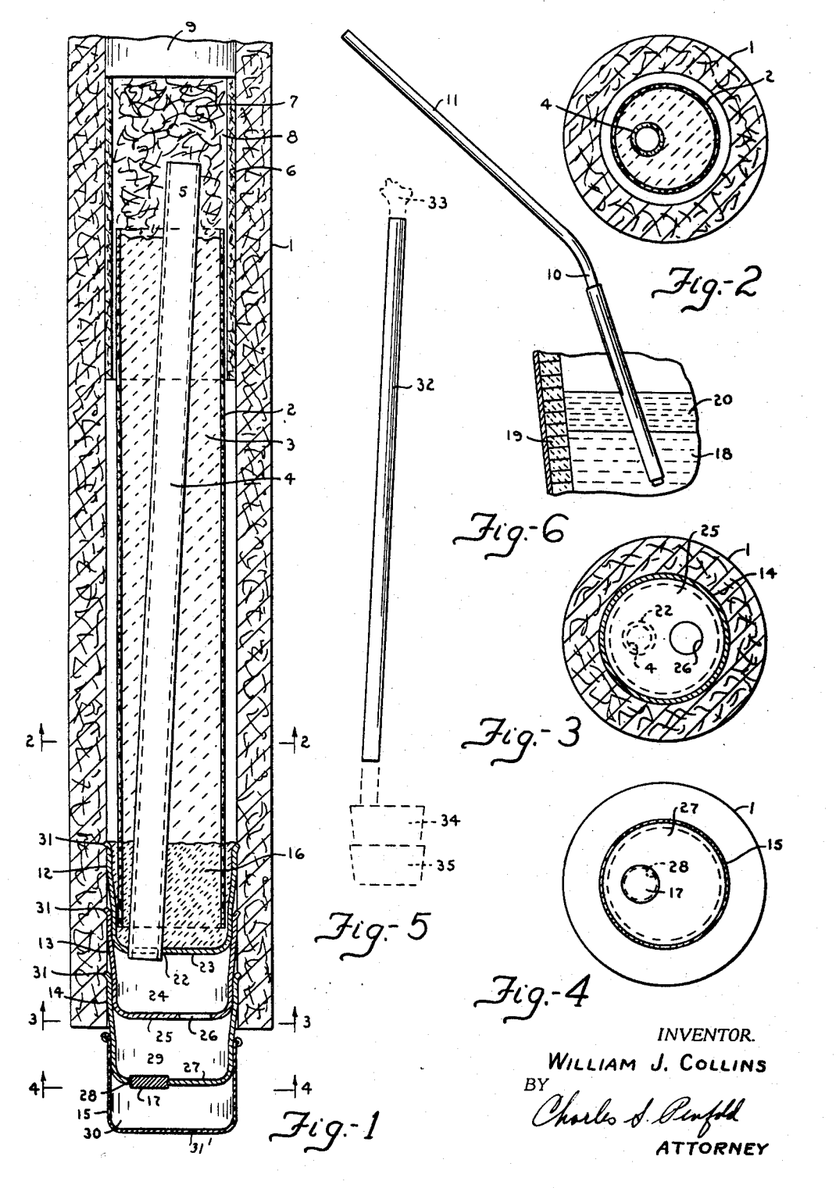
FIGURE 1 is a vertical sectional view of the device, with an end portion broken away.
FIGURE 2 is a transverse section taken substantially on line 2—2 of FIGURE 1.
FIGURE 3 is a transverse section taken substantially on line 3—3 of FIGURE 1.
FIGURE 4 is a transverse section taken substantially on line 4—4 of FIGURE 1.
FIGURE 5 is a view showing a specimen recovered from the device.
FIGURE 6 is a view showing at least one mode of manipulating the device for use in obtaining a specimen from a vessel of molten metal, with only a portion of the vessel being shown.

Referring particularly to FIGURE 1, the device preferably comprises an outer elongate cylindrical tubular housing or jacket 1, an inner elongate cylindrical tubular casing 2 surrounding a mass of insulating material 3, an elongate cylindrical tubular member 4 substantially surrounded and carried by the mass and having an upper end 5 extending beyond the mass, a cylindrical tubular part 6 having a lower extremity surrounding an upper extremity of the casing 2 and an upper extremity extending therebeyond and about the end 5 of the member 4 to define a relief or escape chamber 7 which preferably contains a fibrous mass of material 8, and a socket 9 for detachably receiving an offset 10 of a wand 11 whereby the device may be manipulated.

The device shown in FIGURE 1 also preferably includes a plurality of stacked cups or members 12, 13, and 14, an end cap or cup 15, a mass of high temperature cement 16 in the cup 12, and a fusible element 17 carried by the cup 14. The aforesaid components or parts will be described more in detail subsequently.

The outer housing 1 may be designed and constructed as desired but is preferably made from heavy cardboard so as to provide a rigid unit for protecting the inner structure substantially contained therein from the high temperature of the molten metal bath for a time sufficient to obtain the sample or specimen. This housing may be made in any size but preferably has an outside diameter of two and one sixteenth of an inch, an inside diameter of one and five sixteenths of an inch to provide a wall thickness of three eighths of an inch, and a length of thirty-four inches. The aforesaid wall thickness has proven satisfactory in use and the length in addition to affording sufficient space for the inner structure, serves to provide the socket 9, above referred to, so that a standard or conventional one inch pipe, of which the wand 11 is made, may be readily and snugly detachably received in the socket whereby to facilitate manipulation of the device. The wand is preferably of a length in the neighborhood of ten feet to promote safety in dipping of the device, for example, into a molten steel bath 18 contained in a vessel 19, for penetration through a slag covering or layer 20 to a depth of about fifteen or twenty inches as depicted in FIGURE 6.

The tubular member 4 and mode of mounting or supporting the same will now be described. This member may be designed and constructed from any material and in any shape suitable for the purpose and provides a chamber or mold for receiving a quantity of the molten metal. More specifically, the member is preferably made from a glass known as Pyrex which will withstand high temperatures. The use of glass has proven particularly advantageous because it can be readily broken to obtain access to the solidified sample following recovery. The length of the member may be varied depending on the type or character of sample or specimen desired. The diameter of the member is preferably ten millimeters or under in order to promote controlled cooling of the sample. The member may be internally tapered.

The glass tube 4 is preferably supported or imbedded in a diagonal position in the mass of material 3 which serves to protect and impart stability to the tube as well as support it within the confines of the outer casing 1. The mass 3 may be any material suitable for the purpose. Material, such as plaster of paris, has proven very satisfactory in use and in order to facilitate imbedment or moulding of the tube 4 in the mass, the latter is preferably molded from a plastic or flowable condition into a solid within the confines of the cylindrical tubular casing 2 as shown in the drawings.

The lower end of the casing 2 and the lower end of the glass tube 4 are preferably secured and sealed into the uppermost cup 12 by utilizing the mass of high temperature cement 16 which surrounds the lower ends of the tube and casing in such a manner that the end of the tube 4 extends through an aperture or port 22 provided in a bottom wall 23 of the cup 12. This opening has an axis which is spaced from the center of the wall.

The cement 16 is preferably of a refractory character and offers protection or insulation against the high temperature of the molten metal and promotes its upward flow in the tube 4, and the same is generally true of the mass 3. Otherwise expressed, the masses 3 and 16 serve to insulate and protect the glass tube and constitute a means whereby to promote or encourage uniform cooling of the molten metal as it travels upwardly in the tube.

The cup 13 is preferably connected to the uppermost cup 12 by a telescoping pressed fit so that the cups 12 and 13 are positioned in a nested sealing relationship and define a chamber 24, with the bottom wall 23 of the member 12 being disposed in axially spaced relationship to a bottom wall 25 of the cup 13. The bottom wall 25 constitutes a partition provided with an aperture or port 26 having an axis disposed in a position spaced from its center.

The cup 14 is preferably adapted to be connected to the cup 13 in a mode corresponding to that connecting the cups 12 and 13 and it has a bottom wall 27 constituting a partition provided with an aperture or port 28 having an axis disposed in a spaced relation to the center of this wall. The fusible means or element 17, above referred to, is preferably made of aluminum and is preferably secured in the aperture 28 by a peening or upsetting operation. It will be observed that the bottom wall 27 of the cup 14 is disposed in axially spaced relationship to the wall 25 of the cup 13 and that these cups define a chamber 29.

The cap 15, above referred to, is also preferably made in the form of a cup and is preferably adapted to be press fitted into nesting relationship with the cup 14 and defines in combination therewith a chamber 30. This cap is preferably made of metal of such a character that it will at least become partially disintegrated or ruptured when immersed in the molten metal. In order to facilitate attachment of the cap to the cup 14, the bottom wall of the cap is preferably provided with a relatively small aperture 31 constituting a vent to prevent the release of air from the chamber 30 when the cap 15 is pressed onto the cup.

Attention is directed to the fact that the glass tube 4 is secured in an inclined position in the mass 3; that the lower end of the glass tube 4 and the opening 22 in the bottom wall 23 of the cup 12 are both generally aligned with the opening 28 and the fusible means 17, and that the opening 26 in the bottom wall or partition 25 of the cup 13 is disposed in a staggered or off-center position with respect to the axes of the openings 22 and 28 so that when the cap 15 is disintegrated or otherwise ruptured by the molten metal, the latter will melt the element 17 and thereby allow the metal to successively flow in a tortuous path through the aperture 28 into the chamber 29, the aperture or port 26 into the chamber 24 and thence upwardly into the glass tube 4 and out its upper end 5 into or against the fibrous mass or baffle 8. The element 17 serves to deoxidize the molten metal received in the tube or receiving means 4 or that amount of metal which is expected to form the final specimen. It is believed that this deoxidation serves to promote homogeneity. The metal is deoxidized in the chamber 29 and is mixed by turbulence in the chamber 24 prior to entry in the tube 4. Attention is also directed to the fact that the cup members 12, 13, 14 and the cap 15 constitute a fabricated lower chamber structure and that this structure including the casing 2, mass 3 and glass tube 4 are all connected together to preferably provide a subassembly or unit which is adapted to be pressed into connection with the outer housing 1 of the device. More specifically in this regard, the unit or subassembly is adapted to be pressed into the housing in such a manner that sharp edges of rims 31 formed on the cups 12, 13, and 14 will automatically bite or indent themselves into the material defining the internal cylindrical surface of the housing to lock the subassembly in a desired operative position as exemplified in FIGURE 1 of the drawings. The cap 15 may be attached to the cup 14 before the subassembly or unit is pressed into connection with the housing as just described, but it is preferably applied to the cup 14 after the other components of the unit have been mounted in the housing. Obviously, the unit may be secured or mounted in other ways. For example, it may be cemented in place.

Referring now to the procedure in obtaining or recovering a specimen, the preferred method comprises plunging or dipping the device into the molten bath, through the layer of slag or impurities 20 so that the lower end of the device is below the layer as evidenced in FIGURE 6. The long wand 11 is utilized to manipulate the device and the device is preferably held in the bath for a very brief period of time, for example, a period of from three to ten seconds which causes the cap 15 to be blown free, or otherwise disintegrate or rupture, due to the expanding trapped air in the chamber 30, resulting from the enormous temperature change from, for example, from seventy degrees to twenty-nine hundred degrees Fahrenheit of the metal bath. The cap and mass of cement 16 serve to momentarily insulate the interior of the device as it is being inserted into the molten metal and the cap protects the device against the premature admission of any slag and/or any other surface impurities until the lower end of the device is well below the layer 20. As the cup disintegrates or otherwise enables the molten metal to melt the element 17, the latter diffuses into the molten metal for deoxidizing the same and the two are mixed or conditioned as they successively tortuously flow through the apertures or port 28, chamber 29, port 26 and chamber 24 into the glass tube 4. Deoxidation substantially occurs in the chamber 29 and the mixing substantially in the chamber 24, although some mixing does occur in the chamber 29 prior to entry of the metal into the chamber. The metal thus treated, conditioned or deoxidized flows upwardly through the tube and against the fibrous or baffle means 8 in the upper chamber 7, allowing air to pass through the fibrous means while substantially preventing any great quantity of metal to flow into the chamber. After a few seconds or a sufficient time interval has elapsed in order to permit filling of the tube 4, the device is quickly lifted from the bath of molten metal and then may be subjected to a cooling medium, such as cold water, a blast of cool air or it may be placed on a work bench and allowed to cool. In any event, the specimen retrieved from the molten bath is not utilized until after it has solidified and cooled to such an extent that it can be operated on for analysis. It is desirable that the analysis of the specimen be obtained expeditiously so that it may be quickly analyzed in order to determine or ascertain whether the molten metal is in accord with predetermined specifications or requirements. If, for example, the specimen indicates that the molten metal is not of the character desired, then the metal in the vessel 19 may be modified or changed. In some instances, it may become necessary to obtain more than one sample or specimen of the molten metal before the latter is brought up to a required standard.

The device, upon being subjected to the molten metal, is damaged to the extent that at least a portion of the outer housing is burned away, charred or disintegrated so that, in some instances, a portion of the mass of material disposed about the glass tube may be visible. Also, the cap 15, in some instances, may be completely disintegrated into the molten metal and in other instances, a portion of the cap may still remain attached to the cup 14. Moreover, in some instances, portions of the cups 13 and 14 may disintegrate. In other words, the disintegration or destruction of various components of the device is dependent to their design and construction, the temperature of the molten metal, and the time that the device is held in the latter.

After the device is removed from the molten bath, the outer housing is cut or otherwise broken apart to obtain the subassembly, after which the tubular part 6, fibrous material 8, mass 3, tube 4, cement 16 and cups 13 and 14 may be removed in any mode or order desired so that there remains a specimen having an elongate cylindrical portion 32, an end portion 33 and a pair of joined enlarged end portions 34 and 35 as exemplified in FIGURE 5. The end portion 33 is formed by metal entering the chamber 7 and the end portions 34 and 35 by the chambers 24 and 29. Any portion of the specimen may be utilized for analysis, but the portion 32 which was formed within the confines of the glass tube is preferably utilized after the end portions 33, 34 and 35 are removed as indicated by the dotted lines.

The modified form of device exemplified in FIGURES 7 through 10 of the drawing will now be described. This device, except for an upper part or extremity of the subassembly, substantially corresponds to the device illustrated in FIGURES 1 through 6 of the drawing.

Figures 7, 9:
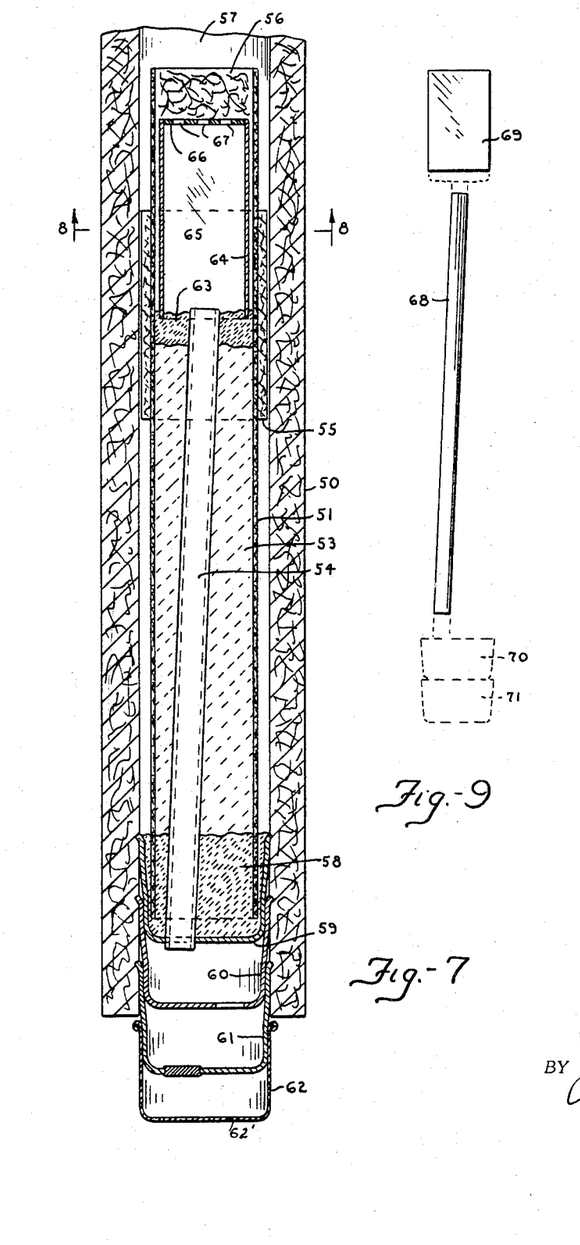
FIGURE 7 is a horizontal section of a modified form of device.
FIGURE 9 is a view showing a specimen obtained through the agency of the device.

More particularly, the modified form of device includes an outer housing 50, tubular casing 51, a mass 53 and a glass tube 54 which substantially respectively correspond to the outer housing 1, tubular casing 2, mass 3 and glass tube 4 of the first-described device. Also, the modified device includes a tubular part 55, a fibrous means or baffle 56 and a socket 57 which more or less correspond to the tubular part 6, fibrous means 8 and socket 9 of the first-described device. Moreover, the modified device includes a mass of high temperature cement 58, cup members 59, 60, 61 and a cap 62 which substantially respectively correspond to the high temperature cement 16, cups 12, 13, 14 and the cap 15 of the first-described device. The cap 62 is preferably provided with a small aperture 62' which serves the same purpose as the aperture 31' in the first-described device.

Figure 8:
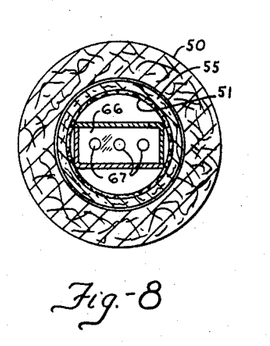
FIGURE 8 is a transverse section taken substantially on line 8—8 of FIGURE 7.

The primary difference between the modified device and the one first described, as alluded to above, resides in the upper extremity or part of the subassembly or unit which is mounted in the outer housing. More specifically in this respect, it will be observed that the tubular casing 51, containing the masses 53 and 58, is preferably made somewhat longer than the casing 2 in the first-described device and that the tubular part 55 is inset with respect to the upper end of the casing 51. It will also be noted that a mass of cement 63 is disposed in the upper end of the tubular casing 51 and surrounds an upper end of the glass tube 54 and that a small box-like structure 64 is also disposed in this tubular casing 51 and has an inner end which is preferably secured in place by the cement so that the interior or a chamber 65 of the structure is communicatively connected with the tube 54. The structure 64 may be designed and constructed in various ways and its inner end may be open before sealing by the cement, or it may have an inner end wall provided with an aperture for receiving the end of the glass tube. Also, it will be observed that the structure 64 has a top wall 66 provided with a plurality of holes 67. The chamber 65 is substantially air tight except for the holes 67 and serves as an escape or relief for any air that flows upwardly as the molten metal rises in the glass tube 54. It will be further observed that the mass of fibrous material 56, which may be steel wool, is disposed in the tubular casing 51 and bears against the upper or outer end wall 66 of the structure 64 as clearly shown. The air may escape through the apertures 67 into the fibrous material for venting the chamber 65 when the molten metal is received in the latter from the glass tube 54. The tubular casing 51 provides a chamber for the cement 63, structure 64 and the fibrous material 56. The structure 64 is preferably of a size so that four of its corners may more or less engage an inner cylindrical peripheral surface of the casing as depicted in FIGURE 8.

Figure 10:
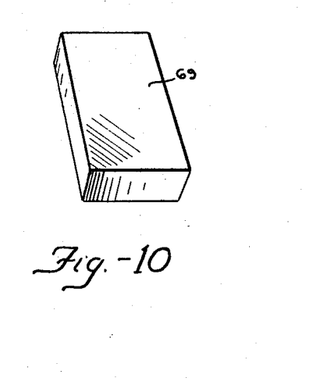
FIGURE 10 is a portion of the specimen illustrated in FIGURE 9.

The specimen obtained by using the modified device is preferably of the character exemplified in FIGURE 9 of the drawing. More specifically in this respect, the sample includes an elongate cylindrical portion 68 having an upper enlarged integral portion 69 conforming in shape to that of the chamber 65 and enlarged portions 70 and 71 conforming to the character of chambers formed by the cup members 60 and 61. Any portion of the specimen may be utilized for analysis. For example, the elongate cylindrical portion 68 may be used or, if desired, the enlarged portion 69 may be removed from the portion 68 for analysis, as shown in FIGURE 10.

In view of the foregoing, it will be apparent that two different devices have been exemplified for the purpose of facilitating the removal of specimens or samples of molten metal for chemical analysis or any other character of analysis desired. The devices have proven very successful in obtaining substantially pure specimens of molten metal and have been accepted by the industry.

Figures 11, 12, 13:
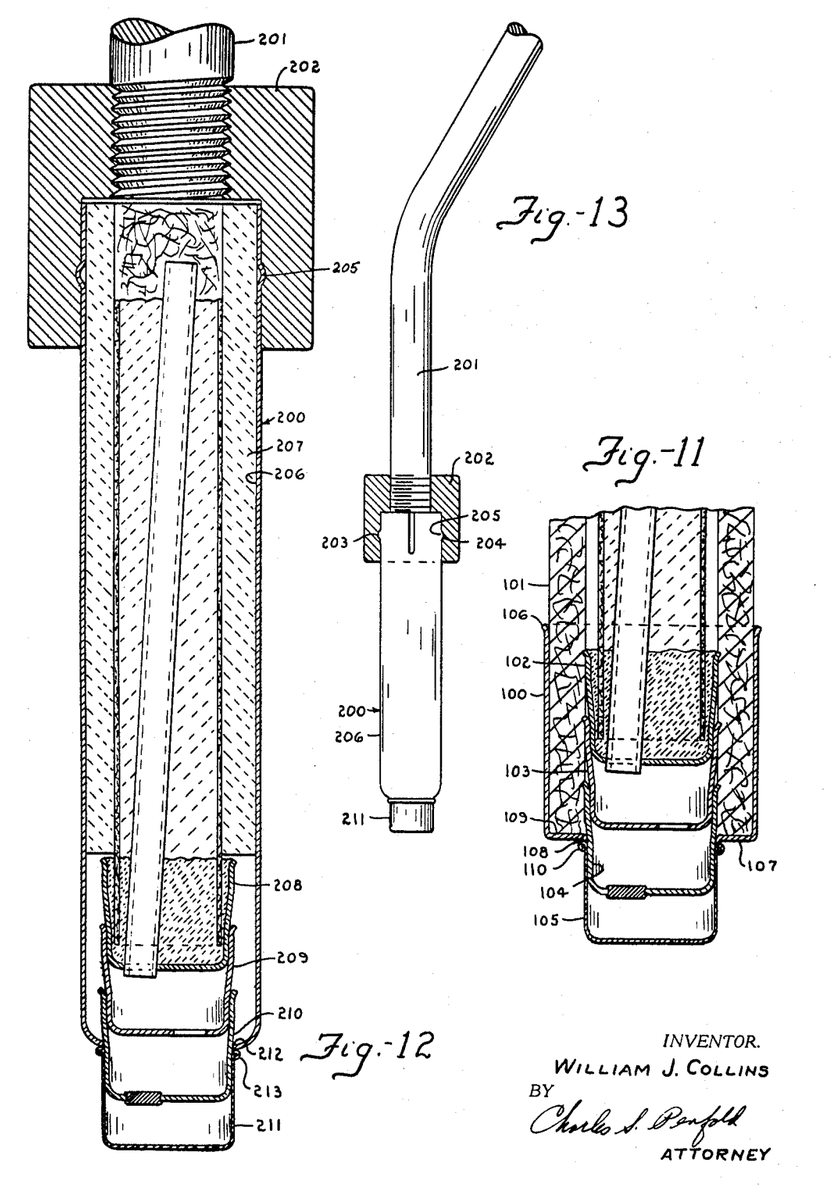
FIGURE 11 is a partial vertical sectional view of another modified form of sampling device.
FIGURE 12 is an elevational view of a further modified form of sampling device.
FIGURE 13 is a partial view of a wand having a fitting, shown in section, for detachably receiving an end of the device depicted in FIGURE 12.

Referring now to the modified sampling device illustrated in FIGURE 11 of the drawing, attention is directed to the fact that the device substantially corresponds to the two forms above described and includes additional means preferably in a form of a sleeve or ferrule 100. More particularly, the device illustrated in FIGURE 11 includes all of the components or parts of the device shown in FIGURE 1, including a tubular housing 101, cups 102, 103, 104, and cap 105. The ferrule 100 preferably includes a cylindrical portion provided with a flanged edge portion 106 and an end wall 107 having an opening therein whereby to accommodate the cup 104. The opening in the end wall 107 of the ferrule is preferably flanged as indicated at 108. The arrangement is preferably such that when the inner structure of the sampling device, including the cups are mounted in the housing 101, the ferrule is press fitted onto the housing 101 so that the end wall 107 of the ferrule will engage an annular end surface 109 of the housing. The flange 106 of the ferrule serves to facilitate the accommodation of the lower end of the housing into the ferrule.

Attention is directed to the fact that the flange 108 is preferably of such a character that when the ferrule is pressed onto the housing, the flange will intimately engage the outer periphery of the cup 104.

Attention is further directed to the fact that after the ferrule is mounted on the housing, the cap 105 is then preferably press fitted onto the cup 104 so that an annular bead 110 on the cap will inimately engage the outer periphery of the cup 104 as well as the flange 108 on the ferrule. With this unique organization, a multiplicity of sealed connections or fits are established whereby to protect or shield an end portion of the housing 101 so that such portion is protected against deterioration by the molten metal and thereby prevent contamination of the specimen. In other words, the ferrule serves to prevent any charred or fibrous material which might break away from the housing from contaminating the specimen as it enters the tube of the inner structure of the device.

The structure illustrated in FIGURES 12 and 13 includes a device generally designated 200 and a wand 201 provided with a fitting 202 having a socket 203 therein which receives an end of the device. Detachability between the device and fitting may be accomplished in various ways but, as illustrated in FIGURE 12, for example, an internal annular surface of the socket 203 is provided with a depression or annular groove 204 which is adapted to detachably receive a detent 205 projecting laterally from a split cylindrical portion of a cylindrical sleeve 206 surrounding a housing 207. The internal structure of the sampling device, includes cups 208, 209, 210, and a cap 211. It will be noted that the cups are all located externally of the housing as distinguished from the organization above described. It will also be observed that the sleeve 206 is of an appreciable length or at least of a length which is sufficient to preferably receive all of the inner components of the sampling device, including a portion of the cup 210. This sleeve serves the same purpose as the ferrule or sleeve 100 utilized in conjunction with the device shown in FIGURE 11, but is more inclusive insofar as affording a complete shield or guard for confining and protecting the internal structure of the sampling device.

Attention is directed to the fact that the housing 207 may be constructed of any material desired. For example, it may be made of a ceramic or earthen material or of fiber such as cardboard. In any event, the sleeve 206 serves to protect the inner structure and particularly the housing 207 so that the latter will not contaminate the specimen to be recovered by the device. Moreover, the sleeve 206 serves to protect a worker because, in some instances, the outer housing 207 when not confined, explodes or distintegrates and causes the molten metal to splash and effect serious injuries. The use of the sleeve prevents the foregoing from happening and an extremely long wand, such as 201, also assists in keeping the device away from the worker while in the act of recovering a specimen of the molten metal.

The sleeve is preferably adapted to be press fitted into telescoping relation with the housing 207 so that an inturned marginal edge portion 212 of the sleeve will intimately engage an outer peripheral surface of the cup 210, after which the cap 211 is preferably press fitted onto the cup 210 so that an annular bead 213 of the cap will intimately engage the edge portion 212 of the sleeve, the purpose of which is to more or less provide a double seal between the sleeve 206 and the cup 210.

Figure 14:
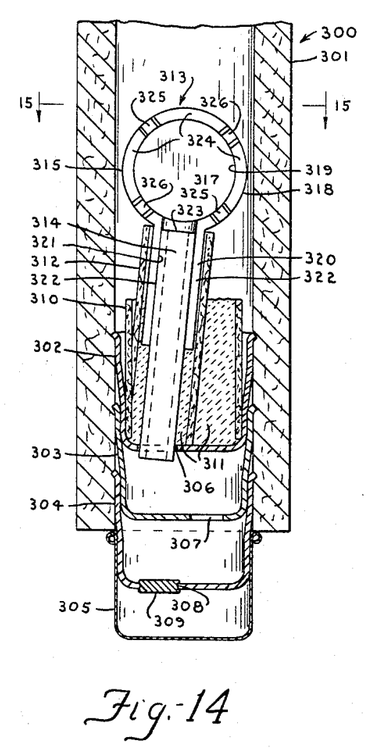
FIGURE 14 is substantially a vertical section of a modified and improved device.
Figure 15:
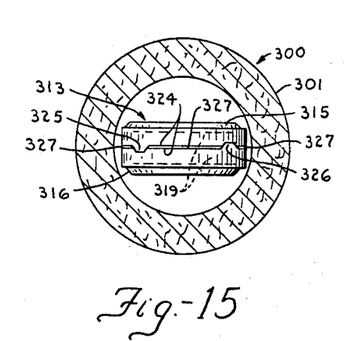
FIGURE 15 is a horizontal or transverse sectional view taken substantially on line 15—15 of FIGURE 15.

The modified sampling device as exemplified in the FIGURES 14 and 15 of the drawings, except for variations in the relative sizes and in a reduction in the number of certain components utilized, substantially corresponds to those devices previously described.

The device generally designated at 300 shown in FIGURE 14 excludes, for example, the part 6 and mass 8 illustrated in FIGURES 1 through 6. More specifically, the device 300 includes an outer jacket or tubular housing 301, constructed of some desirable material such as heavy cardboard, corresponding to the jacket 1 in FIGURE 1 and a pluality of cups 302, 303, 304, 305 which are constructed, operatively connected and supported for the same purpose as the corresponding cups shown in FIGURE 1.

The bottom wall of the innermost cup 302 is provided with an aperture 306, the bottom wall of the cup 303 with an aperture 307, and the bottom wall of the cup 304 with an aperture 308 in which is secured a fusible or meltable element 309. It will be observed that aperture 307 is offset with respect to a line extending through the axes of the apertures 306 and 308, cup 302 by a mass of high temperature cement 311. An inner tube 312 having a diameter less and a length greater than the tube 310 has a lower extremity firmly secured by the cement in the tube 310 and cup 302 and against the bottom wall of the latter in general alignment with the aperture 306. In practice these tubes 310 and 312 are constructed from cardboard, but it is to be understood that any material suitable for this purpose may be utilized. It will be observed that inner portions of the tube 310 and the mass 311 project inwardly beyond the confines of the cup 302 whereby to lend support for the tube 312 and associated components which will now be described.

The device 300 further includes a receiving means or mold structure, generally designated 313, preferably of powdered metal, and an inner tube 314 preferably constructed from Pyrex glass. It is to be understood that any materials which will withstand high temperatures may be uilized.

The receiving means or mold structure 313 may be designed and constructed in various ways but as exemplified in FIGURES 14 through 17, it is preferably comprised of a pair of half or complementary sections 315 and 316. The tube 312, above referred to, constitutes means for maintaining or holding the sections assembled. Each of the sections preferably includes a relatively large annular portion having a bottom wall 317 and side wall structure 318 which define a pocket or recess 319. Each section also preferably includes an integral radial or tapered lateral continuation 320 provided with a semicylindrical groove 321 extending throughout the length of the continuation. Attention is directed to the fact that continuations have opposed longitudinally extending planar edges 322 and that the inner ends of the groove are provided with abutments 323.

Figure 16:
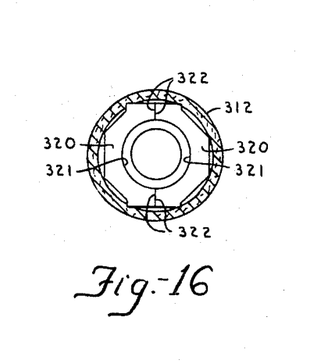
FIGURE 16 is an end view of a subassembly of certain components utilized in the device shown in FIGURE 14.
Figure 17:
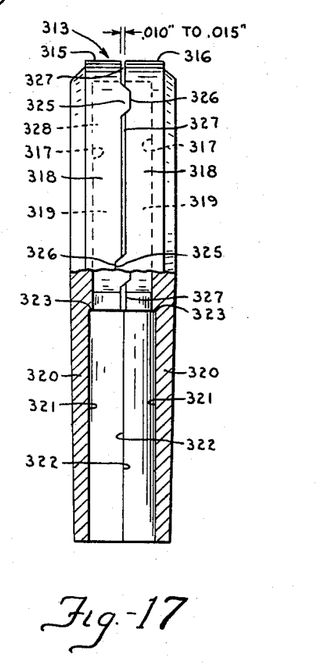
FIGURE 17 is a side elevational view of the subassembly shown in FIGURE 16.

The end surface of each of the wall structures of the sections is planar as indicated at 324 and interrupted by a pair of diametrically disposed projections 325 and a pair of diametrically disposed notches or recesses 326 the latter of which are circumferentially spaced 90° apart from the projections. The receiving means or mold structure 313 is preferably so designed and constructed that when the sections are correctly held in assembled relation by the tube 312 which is telescoped into a snug surrounding relationship with the tapered continuations 320, the opposed planar surfaces 322 of the continuations will be held in intimate bearing relationship and the projections 325 will be disposed in interfitting or interlocking relationship with the notches 326 whereby to mantain the marginal end surfaces 324 of the wall structures of the sections in a predetermined spaced parallel relationship so that preferably a plurality of three circumferentially spaced arcuate vents or openings 327 are provided through which a fluid such as gas or air may escape when the molten metal is received in the mold structure.

Experimentation and testing has proven that the optimum gap, spacing, or size of the vents or openings should be within a range of .010″ to .015″ for sampling basic oxygen processed steels due to their higher temperatures. More particularly in this respect, it was initially believed that no vent openings were essential on the basis that the heat of the molten metal would cause the mold sections to separate and release the trapped gases. However, failures did occur in practice so tests were conducted which proved that the size of the vent or vents was critical. It was discovered that a relatively small vent or a narrow gap between the large portions of the sections caused back pressure and restrained the molten metal from entering and completely filling the receiving means or mold cavity. It was further discovered that a vent of relatively large size or an excessive gap between the large portions of the sections caused the molten metal to bleed through the vent and seal the sections together thereby resulting in obtaining a porous test sample of poor quality. Further, exhaustive tests support the conclusion that a gap between opposed surfaces of the large portions of the sections within a range of between .010″ to .015″ is the most efficient insofar as sampling basic oxygen processed steels in view of their higher temperatures.

Attention is directed to the fact that the projections and notches constitute means which assist in assembling, locating, aligning, or placing the sections in registry; that the pockets 319, in combination, define a chamber 328 which finally receives the molten metal; that the longitudinal grooves 321 in the continuations, in combination, define a tubular formation or socket which snugly receives one extremity of the glass tube 314 which engages the abutments 323 for limiting inward movement of the tube; and that the lower extremity of the glass tube extends beyond the continuations and through the aperture 306 in the cup 302, and is secured in place by the surrounding cement 311 in the tube 312. It will be apparent that the tube 312 is also firmly anchored in place by the cement 311; that the cement within the confines of the tube 312 assists in sealing and securing the glass tube in the socket, the inner ends of the continuations together and the glass tube in the aperture 306 so that the molten metal will flow only through the glass tube prior to reception in the chamber 328 of the receiving means 313. It will be observed that the longitudinal axes of the receiving means 313, glass tube 314 and tube 312 are coincidental and inclined with respect to the longitudinal axis of the outer jacket 301. It is to be understood that the device may be made in which the aforementioned axes may be in alignment with the longitudinal axis of the jacket or parallel thereto.

Figure 18:
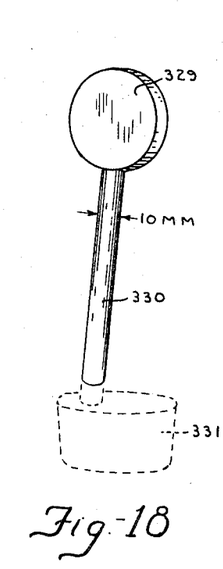
FIGURE 18 is a perspective view showing the resultant sample obtained by utilizing the device.

The device has proven most efficient in use in obtaining a precision cast circular disc 329 attached to a 10 mm.

diameter stem 330 as exemplified in FIGURE 18. Due to the circular shape of the disc, the sample is unilaterally cooled, promoting an equiaxillar columnar grain structure which is beneficial to chemical and physical analyses. Further, the shape and thickness of the disc-like portion 329 of the sample and its resultant structural characteristics offers a setup for spectographic analysis in addition to those just referred to. Moreover, the stem of the device has been designed and constructed for gas analysis. The material and mass of the mold determine the cooling characteristics of the resultant cast sample.

After the sample more or less in a lollypop form has been cast, certain of the various components such as the sections 315 and 316, glass tube 314 may be readily separated, disintegrated, or broken apart so as to obtain the sample structure exemplified in FIGURE 18 after which that portion 331 illustrated in dotted lines may be removed so that the remainder of the lollypop like sample may be subjected for analyses as above described.

In view of the foregoing, it should be manifest that the structure illustrated in FIGURES 14 through 17, among other things, comprises an outer jacket or housing 301; an inner tube 314 which is supported by a mass of material 311 which is highly resistant to heat deterioration; that the means 313 is disposed within the confines of the housing and is provided with a chamber 328 which communicatively connects with the upper end of the tube 314; that means which may comprise one or more of the cups 302, 303, 304 provide at least a second chamber which communicatively connects with the lower end of the tube 314 for initially receiving a liquid for transmission into said tube and the chamber 328; and that means, such as the fusible element 309, serves to condition the fluid in the second chamber prior to its reception into the tube 314.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A device of the character described comprising a protective outer housing, an inner tube disposed in said housing, a mass of material highly resistant to heat deterioration disposed in said housing and supporting said inner tube, a pair of frangible means disposed within the confines of said housing providing an upper chamber communicatively connected with an upper end of said inner tube, and means defining a second chamber communicatively connected with a lower end of said inner tube for initially receiving a liquid for transmission into said tube and upper chamber.

2. A device of the character described comprising a protective outer housing, an inner tube disposed in said housing, a mass of material highly resistant to heat deterioration disposed in said housing and supporting said inner tube, means comprising a pair of complementary recessed frangible sections disposed within the confines of said housing providing an upper chamber communicatively connected with an upper end of said inner tube, and means defining a second chamber communicatively connected with a lower end of said inner tube for initially receiving a liquid for transmission into said tube and upper chamber.

3. A subassembly adapted for mounting in an outer tubular housing, said subassembly comprising a first cup having a bottom wall provided with an aperture, a second cup connected to said first cup defining in combination therewith a first chamber and having a bottom wall provided with an opening, a third cup connected to said second cup defining in combination therewith a second chamber and having a bottom wall provided with an opening, a fusible element secured in said opening of said third cup, an elongate tube having an end disposed in said first cup, a mass of material disposed in said first cup and about a lower end of said tube for securing this end in relation to said aperture, said tube having an upper end extending beyond said mass, and a pair of complementary frangible sections disposed about said upper end of said tube and defining a vented chamber communicating with said upper end of said tube.

4. A device of the kind described comprising an outer elongate housing, structure comprised of a plurality of walls defining a plurality of communicatively connected chambers, at least a portion of said structure being disposed in said housing, elongate tubular means disposed in said housing, means supporting said tubular means so that one end of the latter is communicatively connected with said chambers, a pair of members carried by said tubular means disposed in said housing and defining a chamber communicatively connected with an opposite end of said tubular means, means for securing and supporting said members together in relation to said opposite end of said tubular means, and said chamber being provided with a vent.

5. A subassembly for use with a fluid sampling device, said assembly comprising a cup having a bottom wall provided with an aperture, elongate tubular means resistant to extremely high temperatures having a lower end disposed in said cup, a mass of material disposed in said cup and about said tubular means maintaining said tubular member and cup assembled and said lower end communicatively connected to said aperture, a pair of members defining a chamber communicatively connected to and carried by an upper end of said tubular means, and said chamber being provided with a vent.

6. A subassembly for the purpose described comprising a pair of frangible half sections, each of said sections including a large portion provided with a pocket and a lateral continuation provided with a longitudinal groove, means substantially surrounding said sections for maintaining said sections assembled whereby said pockets in combination define a chamber and said grooves define a tubular formation communicating with said chamber.

7. The subassembly defined in claim 6, in which said chamber is provided with one or more vents.

8. The subassembly defined in claim 6, in which said lateral continuations are provided with opposed surfaces which are intimately engaged throughout at least the major portions of their lengths and said large portions are provided with opposed spaced surfaces which define a vent through which a fluid may escape from said chamber.

9. The subassembly defined in claim 6, in which said large portions of said sections are provided with means whereby to facilitate registry and assembly of said sections and maintain at least a pair of opposed surfaces of said large portions in spaced relationship to define a vent through which a fluid may escape from said chamber.

10. The subassembly defined in claim 6, including elongate tubular means having one end secured in said tubular formation.

11. The subassembly defined in claim 6, in which said large portions of said sections are provided with mating notches and projections for maintaining surfaces of said sections in spaced relation to define a vent for said chamber.

12. The subassembly defined in claim 6, in which at least one of said lateral continuations is provided with an internal abutment, and elongate tube has one end disposed in said tubular formation and in engagement with said abutment.

13. An assembly comprising a cup having a bottom wall provided with an aperture, tubular means disposed in said cup, an elongate tube having a lower end disposed in said tubular means, a mass of material disposed in said cup and about said tubular means and said tube for fixedly securing said tubular means and said tube in said cup with said lower end of said tube in communication with said aperture, a pair of members secured to an upper end of said tube and defining a chamber communicating with said tube, and said chamber being provided with a vent.

14. The assembly defined in claim 13, in which said members are provided with mating notches and projections whereby to facilitate assembly of said members and provide a gap constituting said vent.

15. An assembly comprising a cup having a bottom wall provided with an aperture, an elongate tube having a lower end disposed in said cup, a mass of material disposed in said cup and about said tube for fixedly securing said tube in said cup with its lower end in communication with said aperture, a pair of members connected to an upper end of said tube and defining a chamber communicating with said tube, said members having a pair of opposed surfaces defining a vent having a cross-dimension between .010″ and .015″.

16. The assembly defined in claim 15 in which the inside diameter of said tube is 10 mm.

17. A molded article comprising a head having a predetermined thickness, an elongate stem extending from said head and having a longitudinal axis disposed between opposite faces of said head, and an enlarged portion integral with said stem and disposed in a plane perpendicular to the longitudinal axis of said stem and being severable therefrom, and a breakable sheath of nonmetallic material surrounding said stem.

18. A device of the kind described, said device comprising a housing, a pair of frangible means highly resistant to heat carried by a lower part of said housing and forming a chamber and an entrance through which a hot liquid may enter the chamber, means for supporting and holding said frangible means assembled, and said housing being provided with means for attaching a handle thereto to facilitate dipping the device into a liquid.

References Cited

UNITED STATES PATENTS

| | | | |
|---|---|---|---|
| D. 113,655 | 3/1939 | Davis | D83—1 |
| 285,731 | 9/1883 | Brown | 220—44 |
| 2,150,859 | 3/1939 | Gibson et al. | 220—44 |
| 2,485,492 | 10/1949 | Hubbard et al. | 73—425.4 |
| 2,865,204 | 12/1958 | Lamb | 73—425 |
| 2,970,350 | 2/1961 | Feichinger | 22—90 |
| 2,999,121 | 9/1961 | Mead | 73—359 |
| 3,221,559 | 12/1965 | Miller | 73—425.4 |
| 333,191 | 12/1885 | Anderson | 249—52 |

OTHER REFERENCES

Bassett et al., Open Hearth Proceedings, 1956, AIME, New York. 73/425.6.

S. CLEMENT SWISHER, *Acting Primary Examiner.*